United States Patent [19]

Aten

[11] Patent Number: 5,756,620

[45] Date of Patent: May 26, 1998

[54] TETRAFLUOROETHYLENE POLYMER FOR IMPROVED PASTE EXTRUSION

[75] Inventor: Ralph Munson Aten, Vienna, W. Va.

[73] Assignee: E. I. Du Pont de Nemours and Company, Wilmington, Del.

[21] Appl. No.: 726,976

[22] Filed: Oct. 7, 1996

Related U.S. Application Data

[60] Provisional application No. 60/006,760, Nov. 15, 1995.

[51] Int. Cl.$^6$ ................................................ C08F 14/18
[52] U.S. Cl. ........................................................ 526/255
[58] Field of Search ........................................... 536/255

[56] References Cited

U.S. PATENT DOCUMENTS

| | | | |
|---|---|---|---|
| 2,612,484 | 9/1952 | Bankoff | 260/29.6 |
| 3,819,594 | 6/1974 | Holmes et al. | 260/87.5 A |
| 3,864,322 | 2/1975 | Yallouvakis | 526/247 |
| 4,186,121 | 1/1980 | Gangal | 260/29.6 |
| 4,576,869 | 3/1986 | Malhotra | 428/502 |
| 4,837,267 | 6/1989 | Malhotra | 524/535 |
| 4,879,362 | 11/1989 | Morgan | 526/247 |
| 4,914,146 | 4/1990 | Honda et al. | 526/247 |
| 5,176,958 | 1/1993 | Shimizu et al. | 428/402 |

FOREIGN PATENT DOCUMENTS

| | | | |
|---|---|---|---|
| 0111339 | 6/1984 | European Pat. Off. | 526/255 |
| 0271198 | 6/1988 | European Pat. Off. | 526/255 |
| 2711455 | 10/1977 | Germany | 526/255 |
| 4139665 | 6/1993 | Germany | 526/255 |
| 0836741 | 6/1960 | United Kingdom | 526/255 |
| 0885809 | 12/1961 | United Kingdom | 526/255 |
| 1010228 | 11/1965 | United Kingdom | 526/255 |
| 1122084 | 7/1968 | United Kingdom | 526/255 |
| 2077277 | 12/1981 | United Kingdom | 526/255 |

*Primary Examiner*—Joseph L. Schofer
*Assistant Examiner*—N. Sarofim

[57] ABSTRACT

Modified polytetrafluoroethylene fine powder made with initiator reduced towards the end of dispersion polymerization yields sintered paste extrudate having good surface smoothness.

10 Claims, No Drawings

TETRAFLUOROETHYLENE POLYMER FOR IMPROVED PASTE EXTRUSION

RELATED APPLICATIONS

This application is a continuation of Provisional application Ser. No. 60/006,760, filed Nov. 15, 1995.

FIELD OF THE INVENTION

This invention is in the field of non-melt-fabricable tetrafluoroethylene polymers made by dispersion polymerization.

BACKGROUND OF THE INVENTION

Tetrafluoroethylene (TFE) polymers are well known. The group of TFE polymers includes polytetrafluoroethylene (PTFE), and copolymers of TFE with small concentrations of copolymerizable modifying monomers and having sufficiently high melt viscosity (MV) that the resins remain non-melt-fabricable (modified PTFE). The modifying monomer can be, for example, hexafluoropropylene (HFP), perfluoro(propyl vinyl ether) (PPVE), chlorotrifluoroethylene (CTFE), or other monomer that introduces bulky side groups into the molecule. The concentration of such modifiers is usually less than 1 wt %, commonly less than 0.5 wt %.

PTFE and modified PTFE can be produced by the process known as dispersion polymerization, which typically yields an aqueous dispersion (raw dispersion) of small particles which can be coagulated and dried to obtain coagulated dispersion resin (also known in the art as fine powder) or concentrated and/or stabilized for use as a dispersion. Fine powder resin is commonly converted to useful articles by a lubricated extrusion (paste extrusion) process in which the resin is blended with a lubricant, the lubricated resin (paste) is shaped by an extrusion process, the lubricant is removed, and the resultant green shape is fused (sintered) at temperature above the melting point of the PTFE.

Fine powder resin, whether PTFE or modified PTFE, has high melt viscosity, e.g. a melt viscosity of at least $1 \times 10^8$ Pa·s. Such resin does not flow readily at melt temperature and, therefore, is considered to be non-melt-fabricable.

One important use of fine powder resin has been to provide paste extruded shapes that can be rapidly stretched in the unsintered state to form product that is porous to water vapor but not to condensed water, and is useful in "breathable" fabric material for garments, tenting, separatory membranes, and the like. Resin for this utility is disclosed by Malhotra in U.S. Pat. No. 4,576,869 wherein the achievements of the resin disclosed therein include uniformity of stretch of at least 75% (i.e., good stretching uniformity) for stretching by at least 1000% at stretch rates throughout the range from 10%/sec to 100%/sec at a lubricant loading of 17 wt %. The capability to stretch uniformly at rates as low as 10%/sec indicated the superiority of Malhotra's resin over previous resin which could not be stretched at such low rate. In practice, the fine powder resin which has achieved acceptance for stretching use has been PTFE of high molecular weight. Malhotra admits comonomer modification, but only to the extent that the amount of comonomer is not sufficient to change the characteristics of the resins of his invention.

Other important uses for fine powder resin include paste extruded tubing that is not stretched and which requires a different fine powder resin. One fine powder resin for such utility is generally described by Holmes & Fasig in U.S. Pat. No. 3,819,594 which discloses a TFE fine powder resin consisting essentially of a copolymer of TFE with 0.03–1.0 wt % of perfluoro(alkyl vinyl ether) (PAVE), the resin having MV of from $1 \times 10^9$ to $4.0 \times 10^{10}$ poise ($1 \times 10^8$ to $4.0 \times 10^9$ Pa·s), a standard specific gravity of no greater than 2.175, and a flex life of at least $8 \times 10^6$ cycles after aging at 322° C. for 30 days. Utility of such modified PTFE resin for paste extrusion is disclosed, e.g., for tubing, as are advantages related to low flex modulus and low MV.

The characteristics which have made the Holmes & Fasig fine powder resin successfully applicable to the manufacture of products such as tubing, e.g., for use in fuel and hydraulic hoses, include its paste extrusion characteristics and the low flex modulus and high flex life of sintered extrudate, consequences of the combination of a relatively high proportion of modifier present in the resin, a relatively low melt viscosity in the range of non-melt-fabricable melt viscosities, and relatively low standard specific gravity. The Holmes & Fasig resin is not used to make porous products by stretching, because it does not stretch well. It cannot be stretched, for example, by 1000% at the 100/sec baseline stretching rate of Malhotra. Conversely, the Malhotra resin has not been used to make tubing because of its paste extrusion and sintering characteristics.

Despite the success of the Holmes & Fasig resin in the tubing application, the surface of the tubing after sintering is not as smooth as desired, surface smoothness of such tubing being characterized as greater than 1.0–1.5 µm (see Comparative Example F). Smooth surfaces are needed for handling reasons and as an indicator of quality in paste extrusion, as well as for aesthetic reasons. A fine powder resin that can yield sintered paste extrudate having improved surface smoothness is desired.

SUMMARY OF THE INVENTION

This invention provides a modified polytetrafluoroethylene of the Holmes & Fasig type but having improved characteristics as paste extrudate. Specifically, the invention provides a paste-extrudable composition comprising modified polytetrafluoroethylene fine powder having a melt viscosity of less than $6 \times 10^9$ Pa·s, and as a sintered non-porous paste extrudate, a smoothness of less than 0.75 µm.

The invention also provides an improved process of paste extruding fluoromonomer-modified polytetrafluoroethylene fine powder, made by copolymerizing tetrafluoroethylene with said fluoromonomer in the presence of initiator and surfactant, and sintering the resultant extrudate to form a non-porous article thereof, the improvement comprising improving the surface smoothness of said article by carrying out said copolymerizing wherein said initiator has short half life and its presence is reduced towards the end of the copolymerization reaction.

DETAILED DESCRIPTION OF THE INVENTION

It has been discovered that the surface smoothness of sintered paste extrudate of modified PTFE is significantly improved if the modified PTFE is made by a polymerization process in which the initiator present is reduced towards the end of the process. The reduction in initiator presence is made after the amount of TFE consumed is about 60–85% of the total TFE consumed in the polymerization batch. The reduction in initiator present is at least 80% relative to the initiator present before reduction.

The modified PTFE of this invention is capable of paste extrusion over a wide range of reduction ratios, e.g., in the range of from 100:1 to 1600:1, to form a sintered extrudate having a smoothness of less than 0.75 μm. Smoothness is preferably less than 0.5 μm, most preferably less than 0.3 μm. Normally, the intent of paste extrusion followed by sintering is to form a non-porous article. Generally, non-porous articles have less than 5% voids.

The modified PTFE of this invention is not suitable for stretching. That is, it cannot be stretched by 1000% at a stretching rate of 100%/sec at a lubricant loading of 17 wt % as described in U.S. Pat. No. 4,576,869, or by 600% at the same stretching rate as described in U.S. Pat. No. 5,176,958, or even by 500%. Details on paste extrusion and stretching are disclosed in the Examples.

The TFE polymer resins of this invention are copolymers of TFE with such small concentrations of at least one copolymerizable modifying monomer that the melting point of the polymer (modified PTFE) is not substantially lower than that of homopolymer PTFE. Concentration of modifying monomer in the copolymer is at least 0.001 wt %, generally at least 0.01 wt % but less than 1 wt %, preferably 0.05–0.5 wt % based on total weight of copolymer. These copolymers are non-melt-fabricable. As such, they have melt viscosity (MV) of at least $10^8$ Pa·s. However, MV is less than $6\times10^9$ Pa·s. Preferably MV is at least $5\times10^8$ Pa·s but no more than $5\times10^9$ Pa·s. The modified PTFE resins of this invention are fibrillatible, having rheometer pressure generally in the range 4000–7000 psi (27.6–48.3 MPa), preferably 4300–6000 psi (29.6–41.4 MPa). The modified PTFE generally have standard specific gravity (SSG) in the range 2.155–2.175. Preferably, SSG is 2.160–2.170. As recognized by those skilled in the art, the SSG of the resin of the present invention is low relative to SSG for homopolymer PTFE of comparably low molecular weight, reflecting the presence of modifying monomer. The relatively low molecular weight of the resin of the present invention is indicated by the relatively low MV. Modifying monomer can be, for example, perfluorobutyl ethylene (PFBE), chlorotrifluoroethylene (CTFE), perfluoroolefins having 3–8 carbon atoms, or other monomer that introduces side groups into the molecule. Fluorinated monomers include those in the group consisting of fluorinated vinyl ethers (FVE) of the formula $CF_2=CFOR$ or $CF_2=CFOR'OR$ wherein —R, and —R'— are independently completely-fluorinated or partially-fluorinated linear or branched alkyl and alkylene groups containing 1–8 carbon atoms, respectively. Preferred —R groups contain 1–5 carbon atoms, while preferred —R'— groups contain 2–4 carbon atoms. Perfluorinated monomers are preferred as modifying monomers, and include hexafluoropropylene (HFP) and perfluoro(alkyl vinyl ether) (PAVE) with alkyl group containing 1–3 carbon atoms. Especially preferred are PAVE with alkyl group containing 2–3 carbon atoms, i.e., perfluoro(propyl vinyl ether) (PPVE) and perfluoro(ethyl vinyl ether) (PEVE).

The process of this invention is similar to TFE dispersion polymerizations known in the art, except for the choice and programmed presence of polymerization initiator.

A typical dispersion polymerization process involves the steps of precharging a liquid medium to a stirred autoclave, precharging small amounts of other ingredients, deoxygenating, pressuring with TFE to predetermined level, agitating, bringing the system to desired temperature, e.g., 50°–100° C., introducing initiator, adding more TFE according to predetermined basis, and regulating temperature. The dispersion process for polymerization of TFE is typically conducted in aqueous medium. Water is convenient, liquid over a broad temperature range, essentially non-telogenic when impurities are reduced to low level, inexpensive, and safe. The process of this invention uses an aqueous medium. Recipe and operating parameters not fixed by the equipment are commonly selected in order that temperature is maintained approximately constant throughout the polymerization.

Initiators that can be used in the practice of this invention have short half life. The half life of an initiator, as known to those skilled in the art, is the time required for half of a sample of initiator to produce free radicals under conditions of interest. The time scale on which the half life of an initiator is judged to be short or long is the polymerization time (batch time) for the process of this invention. Generally, initiator half life is less than 20% of batch time, preferably less than 10%, and most preferably less than 5% of batch time. As known to the art, batch time for dispersion polymerization of TFE can vary widely depending on temperature, pressure, initiator activity, and so on. For polymerizations having batch times of 100–120 min, as illustrated by examples of the invention to follow, initiator half life is less than 20 min, preferably less than 10 min, and most preferably less than 5 min.

Initiators that can be used in the process of this invention include redox initiators such as Ce(IV) salt/oxalic acid, bromate/bisulfite, and manganese triacetate/oxalic acid. Preferred redox initiators include those of which the permanganate ion is a component, e.g., potassium permanganate/oxalic acid. Other reducers that can be used in redox systems with permanganates include malonic acid, citric acid, and sodium bisulfite. Other short half life initiators that can be used include persulfates at elevated temperature.

In the polymerization process of this invention, initiator is present at a predetermined level in the earlier part of the polymerization, and at a reduced level in the later part of the polymerization. The state of being present, or "the presence of initiator", is to be interpreted to refer to the amount or concentration of initiator that can produce radicals, but has not yet done so. Since initiator used has short half life, the presence of initiator can be measured in terms of the rate of initiator addition to the reaction mass. Preferably, the rate of initiator addition is uniform during a given stage of polymerization. However, one skilled in the art will appreciate that a wide variety of initiator-addition programs can be employed in the spirit of this invention. Thus, for example, a series of discrete initiator additions can be used, or initiator addition rate can be changed smoothly. Discrete additions can be in equal or varying amounts, and at equal or varying intervals. If such discrete additions are used, the interval between additions is desirably not substantially greater than the initiator half life. Other non-uniform initiator addition programs can be used. When the rate of initiator addition is not uniform during a given stage of polymerization, then the average rate of initiator addition during that stage is used to characterize initiator presence in the process of this invention. If stages of polymerization are not sharply defined, e.g., if initiator addition rate is gradually changed, then average addition rates over earlier and later time intervals can be used to define earlier and later stages.

The amount and timing of initiator reduction is selected so as to be effective to produce the improved surface smoothness of sintered paste extrudate of the resin.

In the process of this invention, the amount of initiator present, i.e., the rate of initiator addition, is reduced in the later stage of polymerization. Generally, the reduction in the amount of initiator present takes place not before 60% of the modified PTFE in the batch is formed but before 85% of the polymer is formed, as measured by TFE consumption.

Preferably, the reduction takes place after 65–80% of the polymer is formed. The amount of initiator present in the later stage of polymerization is reduced, relative to the amount in the earlier stage of polymerization, by more than 80%, preferably at least by 90%. That is, the amount of initiator present in the later stage of polymerization is less than 20%, preferably no more than 10%, of that present in the earlier stage. Reduction in the presence of initiator present towards the end of the polymerization reaction includes the elimination of initiator entirely, i.e., zero addition during the later stage.

Any workable pressure can be used in the process of this invention. High pressure offers an advantage over low pressure in increased reaction rate. However, the polymerization of TFE is highly exothermic, so high reaction rate increases the heat that must be removed or accommodated as temperature increases. Pressures that can be used are also determined by equipment design and by safety concerns in the handling of TFE. Generally, pressures in the range of about 0.3–7 MPa are known for dispersion polymerization of TFE, and pressures in the range 0.7–3.5 MPa are common. While it is common to maintain constant TFE pressure, pressure can be varied.

Substantially non-telogenic anionic surfactants (dispersing agents) are commonly used in dispersion polymerization of TFE. Preferred dispersing agents include perfluoroalkanoic acids having 7–20 carbon atoms, preferably 8–10 carbon atoms, and certain salts thereof, especially ammonium salts. Other dispersing agents that can be used include perfluoroalkylethane sulfonic acids and perfluoroalkylbenzene sulfonic acids and salts thereof. The amount of dispersing agent present, when used, is ordinarily between about 5 ppm and about 500 ppm based on the weight of water present, and is insufficient to cause formation of colloidal particles. If desired, a small amount of a nonionic dispersing agent can be used along with the anionic agent.

If desired, a paraffin wax, i.e., a saturated hydrocarbon having more than 12 carbon atoms, that is liquid at the polymerization temperature may be employed as described by Bankoff in U.S. Pat. No. 2,612,484. Usually, the wax is employed in an amount in the range 0.1–12% by weight based on the weight of water charged to the polymerization reactor.

Other ingredients can be used in recipes for TFE polymerization by the process of this invention. Such other ingredients include, for example, surfactants, additives to minimize formation of autoclave adhesions, color inhibitors, and the like as known to one skilled in the art. Additives to reduce the amount of coagulum formed during the polymerization include, for example, the selected carboxylic acids disclosed by Gangal in U.S. Pat. No. 4,186,121. Such other ingredients are usually, but not necessarily, introduced into the autoclave as part of the precharge.

EXAMPLES

Raw dispersion properties

Solids content of modified PTFE raw dispersion (as polymerized) was determined gravimetrically by measuring the density of the raw dispersion with a hydrometer, then calculating the solids content from the known density of water at the measuring temperature and using 2.285 g/cm$^3$ as the density of the modified PTFE. Raw dispersion particle size (RDPS) was measured by the turbidity method.

Resin properties

Samples of modified PTFE resin were prepared for measurement of standard specific gravity (SSG), melt viscosity (MV), and rheometer pressure by coagulating the raw dispersion by vigorous agitation, separating the liquid, and drying at 150° C. for about 72 hr in a circulating air oven. SSG was measured by the method of ASTM D-4895. MV was measured at 380° C. by the tensile creep method disclosed in U.S. Pat. No. 3,819,594. Rheometer pressure was measured by the method of ASTM D-1457 Section 13.10 using 18.4 wt % Isopar® G (Exxon) lubricant and a reduction ratio of 400:1.

Copolymer composition

Comonomer content of the modified PTFE resins was determined by Fourier transform infrared spectroscopy using absorption bands at 995 cm$^{-1}$ and 2360 cm$^{-1}$ for samples 0.25 mm thick prepared as disclosed in U.S. Pat. No. 4,837,267. PPVE content in wt % was calculated as the ratio of the absorbance at 995 cm$^{-1}$, multiplied by 0.95, to the absorbance at 2360 cm$^{-1}$.

200:1 reduction ratio tubing extrusion

The dried fine powder was prepared by sieving 300 g to insure there were no lumps. The sieved resin was mixed with a lubricant, Isopar® G (Exxon), to a level of 18 wt % lubricant based on combined weight of resin and lubricant, by rolling in a bottle at 11 rpm for 15 min at room temperature. The blended resin was then aged overnight at room temperature. The blended resin was then sieved again, and formed into a preform of diameter 6.03 cm by applying a pressure of approximately 0.4 MPa for 60 sec. The preform was loaded into a 75-ton vertical down extruder (Jennings International Corp.) having a barrel of diameter 6.35 cm and equipped with a tubing die. The die had a diameter of 0.635 cm which tapered at an angle of 20° to a tip diameter of 0.457 cm. The mandril had a diameter of 1.59 cm. The preform was extruded through the die at a ram speed of 2.54 cm/min. The extrudate was passed through a 6-m long drying oven, the first two quarters of which were operated at 260° C. and the last two quarters of which were operated at 315° C. The dried extrudate was then passed through a 9-m long sintering oven, the first quarter of which was operated at 400° C., the second quarter at 370° C., the third quarter also at 370° C., and the final quarter with no heating for cool down before the tubing exited the oven.

1000:1 reduction ratio tubing extrusion

The resin was extruded at 1000:1 reduction ratio in the same manner as at 200:1 except for the following differences. The die had a diameter of 0.092 inch (2.34 mm) which tapered at an angle of 20° to a tip diameter of 0.051 inch (1.30 mm). The preform was extruded through the die at a ram speed of 1.27 cm/min. The first quarter of the 6-m long drying oven was operated at 230° C., while the first quarter of the sintering oven was operated at 385° C.

Surface smoothness

Surface smoothness was measured on a sample of tubing 10 cm long using a profilometer (Surtronic 3P Model 221–57, Taylor-Hobson) equipped with a chisel pickup. The chisel was set on the outside surface of the tube, with the long dimension of the chisel perpendicular to the long dimension (axial direction) of the tube, and was translated along the tube surface in the axial direction for a distance of 0.188 inch (4.8 mm), and the rms (root mean square) departure from the mean position of the chisel pickup was recorded. This measurement was made at five evenly spaced places along the length of tubing. Reported values are the average of the five measurements taken. Smaller values, of course, indicate a smoother surface.

Stretch test

A sample of the fine powder resin was screened through a 2000 μm sieve. One hundred grams of this resin were admixed with 17 wt %, based on combined weight of resin and lubricant, of Isopar® K (Exxon) lubricant at room temperature by shaking in a glass jar of 6 cm inside diameter and rolling for 4 min at 64 rpm. The lubricated resin was then preformed at 400 psi (2.8 MPa) at room temperature in a tube 26 mm in diameter and 23 cm long. The preform was then paste extruded at room temperature through an orifice (2.4 mm diameter, 5 mm land length, 30° entrance angle) into a uniform beading. The extrusion speed, i.e., ram speed, was 51 cm/min. The beading was dried at 190° C. for 20 min. A length of beading was cut and clamped at each end leaving a space of 50 mm between clamps, and heated to 300° C. in a circulating air oven. The clamps were then moved apart at the desired rate to a separation corresponding to a stretch of at least 1000%, and the specimen was examined for integrity, uniformity of stretch, even appearance and surface roughness. This stretch test essentially follows the method disclosed in U.S. Pat. No. 4,576,869.

Example 1

A horizontally disposed, water/steam jacketed, cylindrical stainless-steel autoclave located in a barricade and having a capacity of 36.3 liters and a length-to-diameter ratio of about 1.5:1, and provided with a 4-bladed cage-type agitator capable of being agitated at 70 rpm and running the length of the autoclave, was evacuated, and then charged with 600 g of paraffin wax, 20.9 kg of demineralized water, 1 g of succinic acid, 0.5 g of oxalic acid, and 25 ml of a 20 wt % aqueous solution of ammonium perfluorooctanoate dispersing agent. Oxygen was removed from the charge by alternately evacuating and purging with TFE at 65° C., after which 30 ml of PPVE was added through a vacuum stopcock. The autoclave and its contents were heated to 80° C. while being agitated at 70 rpm. At this point 1.7 kg of tetrafluoroethylene were added to pressure the autoclave to 2.72 MPa (absolute). Then, injection of a solution of 0.1 g/liter of potassium permanganate in demineralized water into the autoclave at 25 ml/min was started, for an initiator injection rate of 2.5 mg/min of potassium permanganate. After 5 min, the pressure in the autoclave began to drop, signaling kickoff. TFE was fed into the autoclave to maintain pressure at 2.72 MPa. At 10 min after kickoff, 1.4 kg of TFE had been fed to maintain pressure, at which point a solution of 27.5 g of C-8 per liter of demineralized water was injected at 50 ml/min for 20 min, such that 1000 ml of solution were injected. When a total of 11.8 kg of TFE, including the amount needed to initially pressure up the autoclave, had been injected into the autoclave, the pumping rate of the potassium permanganate solution was changed to 1 ml/min, for an initiator injection rate of 0.1 mg/min of potassium permanganate. When a total of 15.4 kg of TFE had been fed, the batch was terminated by stopping agitation and venting the autoclave. The shell portion of the polymer, during which time the initiator injection rate was reduced, was approximately 26% of the TFE reacted. Batch time from kickoff to vent was 107 min, producing a dispersion having 40.8 wt % solids and RDPS of 0.18 µm. PPVE content of the modified PTFE was 0.097 wt %, SSG was 2.164, MV was $1.8 \times 10^9$ Pa·s, and rheometer pressure was 33.1 MPa. The modified PTFE fine powder resin was extruded to tubing at 200:1 reduction ratio as outlined above, during which the extrusion pressure was 13.8 MPa. The surface smoothness of the tubing was 0.38 µm, showing the excellent smoothness of sintered paste extrudate obtained for 200:1 reduction ratio extrusion when the presence of initiator is reduced towards the end of the polymerization reaction.

Another portion of the modified fine powder resin was subjected to the stretch test described above at stretch rates of 10%/sec and 100%/sec. The beading failed to stretch at either rate, breaking near one of the clamps after stretching by less than 50% at the 100%/sec stretch rate, and fracturing into 15 short segments with no apparent stretching at the 10%/sec stretch rate. Thus, the polytetrafluoroethylene fine powder of the present invention does not pass the stretch test at the stretching rate of 100%/sec for a degree of stretch of 1000%, or even 600%. These results show that the fine powder resin of the present invention does not meet the requirements of, and therefore is different from the resin of, U.S. Pat. No. 4,576,869. Likewise, the resin is different from that of U.S. Pat. No. 5,176,958. In a similar test at 100%/sec stretching rate but with 17.8 wt % lubricant, the beading shattered into 14 small pieces with no apparent stretching.

Example 2

The polymerization procedure of Example 1 was essentially repeated. Batch time from kickoff to vent was 106 min, producing a dispersion of 40.3 wt % solids and RDPS of 0.17 µm. PPVE content was 0.076 wt %, SSG was 2.162, MV was $2.5 \times 10^9$ Pa·s, and rheometer pressure was 30.6 MPa. During 1000:1 reduction ratio extrusion into tubing, the extrusion pressure was 80.7 MPa. The surface smoothness of the tubing was 0.41 µm, showing the excellent smoothness of sintered paste extrudate obtained for 1000:1 reduction ratio extrusion when the presence of initiator is reduced towards the end of the polymerization reaction.

Example 3

The polymerization procedure of Example 1 was essentially repeated, except that during the later stage of the polymerization the initiator injection rate was reduced to zero. Batch time from kickoff to vent was 114 min, producing a dispersion of 42.0 wt % solids and RDPS of 0.19 µm. PPVE content was 0.081 wt %, SSG was 2.164, MV was $2.3 \times 10^9$ Pa·s, and rheometer pressure was 41.1 MPa. During 200:1 reduction ratio extrusion into tubing, the extrusion pressure was 17.9 MPa. The surface smoothness of the tubing was 0.25 µm. Example 3 shows the excellent smoothness of sintered paste extrudate obtained when the presence of initiator is eliminated towards the end of the polymerization reaction.

Comparative Example A

The polymerization procedure of Example 1 was repeated, except that the initiator pumping rate was maintained at 25 ml/min for the entire batch. Batch time from kickoff to vent was 77 min, producing a dispersion of 40.6 wt % solids and RDPS of 0.17 µm. PPVE content was 0.093 wt %, SSG was 2.170, MV was $0.7 \times 10^9$ Pa·s, and rheometer pressure was 21.0 MPa. During 200:1 reduction ratio extrusion into tubing, the extrusion pressure was 14.5 MPa. The surface smoothness of the tubing was 1.12 µm. This shows the poor smoothness of sintered extrudate obtained in 200:1 reduction ratio tubing extrusion of modified PTFE made without reducing the presence of initiator towards the end of polymerization.

Comparative Example B

The polymerization procedure of Comparative Example A was essentially repeated. Batch time from kickoff to vent was 72 min, producing a dispersion of 43.0 wt % solids and RDPS of 0.18 µm. PPVE content was 0.095 wt %, SSG was 2.166, MV was $0.9 \times 10^9$ Pa·s, and rheometer pressure was 23.0 MPa. During 1000:1 reduction ratio extrusion into tubing, the extrusion pressure was 50.0 MPa. The surface smoothness of the tubing was 1.60 μm. This shows the poor smoothness of sintered extrudate obtained in 1000:1 reduction ratio tubing extrusion of modified PTFE made without a reduction in the amount of initiator present in the later stage of polymerization.

Comparative Example C

The polymerization procedure of Example 1 was essentially repeated, except that during the later stage of the polymerization the initiator injection rate was reduced to 5 ml/min, for an initiator injection rate of 0.5 mg/min of potassium permanganate. Batch time from kickoff to vent was 80 min, producing a dispersion of 40.4 wt % solids and RDPS of 0.17 μm. PPVE content was 0.099 wt %, SSG was 2.164, MV was $1.3 \times 10^9$ Pa·s, and rheometer pressure was 24.6 MPa. During 200:1 reduction ratio extrusion into tubing, the extrusion pressure was 14.5 MPa. The surface smoothness of the tubing was 1.04 μm. This result shows that the rate of initiator addition should be reduced by more than 80% in the later stage of polymerization.

Comparative Example D

The polymerization procedure of Example 1 was repeated, except that the initiator injection rate was reduced when 13.2 kg of TFE (85.4% of total TFE) had been fed. Batch time from kickoff to vent was 86 min, producing a dispersion of 40.4 wt % solids and RDPS of 0.19 μm. PPVE content was 0.086 wt %, SSG was 2.164, MV was $1.4 \times 10^9$ Pa·s, and rheometer pressure was 32.1 MPa. At 1000:1 reduction ratio extrusion into tubing, the extrusion pressure was 82.4 MPa. The surface smoothness of the tubing was 1.35 μm. This result shows that the amount of initiator present should be reduced before 85% of the TFE used in the batch is consumed.

Comparative Example E

The polymerization procedure of Example 1 was repeated, except that the initiator injection rate was reduced when 9.5 kg of TFE (57% of total TFE) had been fed. Batch time from kickoff to vent was 153 min, producing a dispersion of 40.7 wt % solids and RDPS of 0.18 mm. PPVE content was 0.070 wt %, SSG was 2.157, MV was $4.8 \times 10^9$ Pa·s, and rheometer pressure was 26.1 MPa. During 1000:1 reduction ratio extrusion into tubing, the extrusion pressure was 74.1 MPa. The surface smoothness of the tubing was 1.22 mm. This result shows that the amount of initiator present should be reduced after 57% of the TFE used in the batch is consumed.

Comparative Example F

Fine powder resin prepared generally according to the procedure of Example 1 of U.S. Pat. No. 3,819,594 and having RDPS of 0.186 mm, PPVE content of 0.115 wt %, SSG of 2.151, MV of $1.7 \times 10^9$ Pa·s, and rheometer pressure of 25.4 MPa was paste extruded to tubing at 1000:1 reduction ratio as outlined above. Extrusion pressure was 50.3 MPa. Surface smoothness of the sintered tubing was 1.96 mm. The procedure of the '594 patent employs a precharge of ammonium persulfate (APS) initiator and a polymerization temperature of 65° C. At this temperature, APS does not have short half life, so its presence was not sufficiently reduced toward the end of the reaction for the resultant fine powder resin to yield good surface smoothness.

I claim:

1. In the process of paste extruding fluoromonomer-modified polytetrafluoroethylene fine powder made by copolymerizing tetrafluoroethylene with said fluoromonomer in the presence of initiator and surfactant, said fluoromonomer constituting 0.01 to 1 wt % of said fine powder and said fine powder having an SSG of 2.155 to 2.175, and sintering the resultant extrudate to form a nonporous article thereof, the improvement comprising improving the surface smoothness of said article by carrying out said copolymerizing wherein said initiator has short half life and its presence is reduced towards the end of the copolymerization reaction said short half life being less than 20% of the time of said polymerizing, the reduction in presence of said initiator being not before 60% of said fluoromonomer-modified polytetrafluoroethylene is formed but before 85% of said polytetrafluoroetlaylene is formed.

2. In the process of claim 1, wherein the improvement additionally comprises carrying out the copolymerization at essentially constant temperature.

3. In the process of claim 1, wherein said fluoromonomer is present in said copolymer in an amount up to 0.5 mol% thereof.

4. In the process of claim 1, wherein said fluoromonomer is perfluoroolefin or perfluoro(alkyl vinyl ether).

5. In the process of claim 1, wherein said initiator is redox initiator.

6. In the process of claim 5, wherein permanganate is a component of said redox initiator.

7. Sintered paste extrudate comprising polytetrafluoroethylene fine powder, said polytetrafluoroethylene being modified with 0.001 to 1 wt % fluoromonomer and prior to paste extrusion having a melt viscosity of less than $6 \times 10^9$ Pa·s and SSG of 2.155 to 2.175, said sintered extrudate having a smoothness of less than 0.75 μm.

8. The sintered paste extendable composition of claim 7 wherein said polytetrafluoroethylene fine powder is made by copolymerization of modifying fluoromonomer with tetrafluoroethylene in an aqueous medium in the presence of surfactant and initiator having short half life, wherein the amount of said initiator is reduced towards the end of the copolymerization reaction.

9. The sintered paste extrudate of claim 7, which as a paste extruded composition prior to sintering is incapable of being stretched by 500% by the stretch test at a stretching rate of 100%/second.

10. The sintered paste extrudate of claim 7 in the form of sintered tubing.

* * * * *